United States Patent
Sakai et al.

(10) Patent No.: US 6,450,029 B1
(45) Date of Patent: Sep. 17, 2002

(54) CAPACITIVE PHYSICAL QUANTITY DETECTION DEVICE

(75) Inventors: Minekazu Sakai, Kariya; Shinji Yoshihara, Nagoya, both of (JP)

(73) Assignee: Denso Corporation, Kariya (JP)

( * ) Notice: Subject to any disclaimer, the term of this patent is extended or adjusted under 35 U.S.C. 154(b) by 180 days.

(21) Appl. No.: 09/667,800

(22) Filed: Sep. 22, 2000

(30) Foreign Application Priority Data

Sep. 27, 1999 (JP) .......................................... 11-272585
Sep. 30, 1999 (JP) .......................................... 11-279971

(51) Int. Cl.[7] .............................................. G01P 15/00
(52) U.S. Cl. ...................... 73/488; 73/1.38; 73/514.18; 73/652; 324/661
(58) Field of Search ...................... 73/488, 652, 514.18, 73/514.32, 514.16, 862.61, 1.38; 324/661, 672, 678, 686, 162; 361/280, 283.1, 283.3

(56) References Cited

U.S. PATENT DOCUMENTS

| | | | |
|---|---|---|---|
| 4,404,481 A | * | 9/1983 | Ide et al. ...................... 307/491 |
| 5,506,454 A | | 4/1996 | Hanzawa et al. .......... 307/10.1 |
| 5,540,095 A | | 7/1996 | Sherman et al. .......... 73/514.32 |
| 5,583,290 A | | 12/1996 | Lewis ...................... 73/514.18 |
| 5,618,989 A | | 4/1997 | Marek ........................ 73/1.38 |
| 5,900,529 A | * | 5/1999 | Hanisko et al. .............. 73/1.38 |
| 5,952,572 A | * | 9/1999 | Yamashita et al. ........ 73/504.04 |
| 6,082,196 A | * | 7/2000 | Nonoyama et al. ...... 73/514.18 |
| 6,240,782 B1 | * | 6/2001 | Kato et al. ................ 73/514.32 |
| 6,257,061 B1 | * | 7/2001 | Nonoyama et al. ...... 73/514.32 |

FOREIGN PATENT DOCUMENTS

| EP | 1128173 A2 | * | 8/2001 |
| JP | 2000-81449 | | 3/2000 |

OTHER PUBLICATIONS

US 2002/0011107, Dynamic quantity sensor having movable and fixed electrode with high rigidity, Sakai et al., Jul. 03, 2001.*
US2002/0011108 A1, Capacitive physical quantity sensor, Aoyama et al., Jul. 11, 2001.*
US2001/0019273 A1, signal processing apparatus.*
U.S. application Ser. No. 09/342,097, Nonoyama, filed May 28, 1999.

* cited by examiner

Primary Examiner—Hezron Williams
Assistant Examiner—Jacques Saint Surin
(74) Attorney, Agent, or Firm—Law Offices of David G. Posz

(57) ABSTRACT

A capacitive semiconductor acceleration sensor capable of efficiently performing a self-diagnostic procedure without having to provide any separate electrodes for self-diagnosis purposes. The acceleration sensor includes a beam portion that is deformable upon application of acceleration thereto in a direction at right angles to the elongate direction thereof to thereby exhibit a spring function. The sensor also includes a movable electrode and fixed electrodes which are integrally formed with the beam portion. The sensor is operable to detect the acceleration while applying between the movable electrode and fixed electrodes a periodically changeable signal to derive an output voltage variable in potential with a differential capacitance change of capacitors between the both electrodes. Here, a detection signal for detection of such acceleration and a self-diagnosis signal are selectively applied while permitting creation of quasi-acceleration at the movable electrode due to application of the self-diagnosis signal, wherein a ratio of a frequency of the self-diagnosis signal to a resonance frequency of the beam portion in its deformation direction is set so that the resultant resonance magnification of such beam portion is more than or equal to one time upon application of the self-diagnosis signal.

8 Claims, 5 Drawing Sheets

CAPACITIVE PHYSICAL QUANTITY DETECTION DEVICE

CROSS REFERENCE TO RELATED APPLICATION

This application is based upon Japanese Patent Application Nos. Hei. 11-272585 filed on Sep. 27, 1999, and Hei. 11-279971 filed on Sep. 30, 1999, the contents of which are incorporated herein by reference.

BACKGROUND OF THE INVENTION

1. Field of the Invention

This invention relates to physical quantity detection apparatuses, and particular to a device for detecting the physical quantity such as acceleration, angular velocity, pressure or the like.

2. Related Art

Conventional capacitive physical quantity detection devices for detection of the physical quantity of the type which offer self-diagnosis capabilities include a capacitive acceleration sensor which is disclosed, for example, in Published Unexamined Japanese Patent application No. 8-110355. The capacitive acceleration sensor as taught thereby is designed to include a spring portion (beam portion) that is elastically deformable upon application of acceleration as the physical quantity to be detected, a movable electrode that is integrally formed with this spring, and a couple of stationary or fixed electrodes that are disposed to oppose this movable electrode, wherein a difference in capacitance between two capacitive elements as formed between the movable electrode and the fixed electrodes is subject to C-V conversion for measurement of an output.

The conventional capacitive acceleration sensor further includes an extra separate electrode in addition to the movable and fixed electrodes. This additional electrode is for use in performing the intended self-diagnosis and sometimes called "self-electrode" among those skilled in the art. Application of a certain voltage to this self-electrode permits creation of an electrostatic force, which in turn causes the spring portion to deform or offset in position for execution of the self-diagnosis required.

Unfortunately the conventional capacitive physical quantity capacitive detection device is encountered with a problem as to unwanted increases in overall size of the resultant device structure due to additional provision of the separate self-diagnosis electrode for establishment of the state of virtual creation of the physical quantity of interest.

SUMMARY OF THE INVENTION

This invention has been conceived in view of the background thus far described and its object is to provide a new and improved capacitive physical quantity detection device capable of avoiding the problem faced with the prior art.

It is another object of the invention to provide a capacitive physical quantity detector device capable of efficiently performing the intended self-diagnosis operation without having to additionally provide any separate electrode for exclusive use as a diagnosis electrode.

To attain the foregoing objects, in accordance with a first aspect of the present invention, a capacitive detection device is provided which includes a spring portion and a movable electrode and fixed electrode as integrally formed with the spring portion and operable to detect the physical quantity of interest in such a manner as to apply a periodically changeable signal between the movable electrode and the fixed electrodes and then derive an output voltage that is potentially variable in away pursuant to a change in capacitance value of a capacitive element as formed of the movable electrode and fixed electrode, characterized in that a detection signal for use in detecting the physical quantity and a self-diagnosis signal for use in performing self-diagnosis are selectively applied thereby permitting creation of a quasi-physical quantity at the movable electrode through deformation of the spring upon application of the self-diagnosis signal, and that the ratio of a frequency of the self-diagnosis signal to a resonance frequency of the spring in its deformation direction is specifically designed so that the resonance magnitude of this spring becomes more than one time upon application of the self-diagnosis signal.

First, in accordance with the instant invention, periodical application of the self-diagnosis signal between the movable electrode and the fixed electrode during self-diagnosis permits production of an electrostatic force between the movable electrode and fixed electrode, which in turn makes it possible to allow both the spring and the movable electrode integral therewith to deform causing the movable electrode to be set in the state in which the physical quantity is virtually generated. In this case, it is possible to perform the intended self-diagnosis through detection of a positional offset or deformation of the movable electrode based on an output voltage of a C-V converter circuit.

Note here that in cases where the frequency of the self-diagnosis signal is significantly different from the resonance frequency of the spring in the deformation direction thereof, movement or motion of the spring hardly keeps track of the frequency of the self-diagnosis signal. In other words the spring does not vibrate, which could result in establishment of the state of direct current (DC) voltage application. In contrast thereto, if the frequency of the self-diagnosis signal is close in value to the resonance frequency then the spring exhibits resonance, thereby making it possible to allow the spring to deform with a greater amplitude than in the case of DC-like deformation. In this way, applying the self-diagnosis signal for permitting vibration of the spring makes it possible to increase the quasi-physical quantity occurring at the movable electrode, which in turn enables achievement of an efficient self-diagnostic procedure required.

Also note that in this invention, the ratio of the frequency of self-diagnosis signal to the resonance frequency of the spring portion in its deformation direction is specifically designed so that the spring's resonance magnitude (i.e. the one with a positional offset of the spring and movable electrode being normalized or standardized as "1" upon applying of a DC voltage) is more than or equal to one time—preferably, 1.1 times. With such an arrangement, it is possible to permit the spring to vibrate upon application of the self-diagnosis signal, which in turn makes it possible to achieve the intended efficient self-diagnosis procedure. Hence, in accordance with the invention, it becomes possible to provide the capacitive physical quantity detection device capable of efficiently performing self-diagnosis without requiring additional provision of any separate electrode for exclusive use with the self-diagnostic procedure.

In accordance with a second aspect of this invention, in the relation of the frequency of the self-diagnosis signal versus the resonance frequency of the spring portion in its deformation direction, the self-diagnosis signal frequency is specifically designed so that it is less than or equal to a limited value that is 1.41 times (preferably, 0.2 to 1.4 times)

greater than the resonance frequency of the spring in the deformation direction thereof. With the setting of such relation, it is possible to force the spring to vibrate at its resonance magnitude of more than or equal to one time upon application of the self-diagnosis signal, thereby enabling increase in efficiency of the self-diagnosis. Due to this, it becomes possible to provide the intended capacitive physical quantity detection device capable of efficiently performing self-diagnosis without having to provide any separate electrode for exclusive use during the self-diagnostic procedure.

In accordance with a third aspect of the invention, in the relation of the frequency of the self-diagnosis signal versus the resonance frequency of the spring in its deformation direction, the ratio of the self-diagnosis signal frequency to the spring's resonance frequency in its deformation direction is specifically determined to let the spring vibrate upon application of the self-diagnosis signal thereto. This makes it possible to permit the spring to vibrate with the resonance magnitude of more than or equal to one time when the self-diagnosis signal is applied thereto, which leads to an ability to provide the intended capacitive physical quantity detection device capable of efficiently performing self-diagnosis without requiring additional provision of any separate electrode dedicated to the self-diagnosis required.

In accordance with a fourth aspect of the invention, a capacitive physical quantity detection device is provided which is designed to detect the physical quantity of interest by applying a periodically changeable signal between a movable electrode and fixed electrode which are integrally formed with a beam portion and each of which has a beam-like shape extending in the same direction as the beam portion and then deriving an output voltage potentially variable with a change in capacitance value of a capacitor consisting of the movable electrode and fixed electrode while selectively applying a detection signal for use in detecting the physical quantity and a self-diagnosis signal for effectuation of self-diagnosis to thereby permit creation of a quasi-physical quantity at the movable electrode through deformation of the beam portion upon application of the self-diagnosis signal thereto.

A further feature of the invention is that a beam width at the movable electrode in its deformation direction is substantially the same as a beam width at the beam portion in the deformation direction thereof while at the same time causing rigidity or stiffness at the movable electrode in its deformation direction to be greater than stiffness at the beam portion in the deformation direction thereof.

In accordance with the invention, since during the self-diagnosis the self-diagnosis signal is periodically applied between the movable electrode and the fixed electrode for creation of an electrostatic force between the movable electrode and fixed electrode, it becomes possible to cause the beam portion and the movable electrode integral therewith to deform or offset in position in a specified direction at right angles to the elongate direction of the beam, which in turn makes it possible to establish the state in which the physical quantity is virtually generated at the movable electrode. In this case, it is possible to perform the self-diagnosis through detection of resultant deformation of the movable electrode on the basis of an output voltage of the C-V converter circuit.

During this self-diagnosis, an increase in deformation of the movable electrode would result in a likewise increase in change of capacitance value of the capacitor consisting of the movable and fixed electrodes, which in turn makes it possible to increase the output voltage thus enabling efficient self-diagnosis. One preferable approach to attaining this is to lighten the movable electrode through decrease in beam width at the movable electrode in its deformation direction. However, an excessive decrease in beam width can result in not only the beam portion but also the movable electrode per se being bent and offset in position upon application of the physical quantity.

Although in the capacitive physical quantity detection device of this type it is required that the deformation of the beam portion and that of the movable electrode be integral with each other and also in the same direction upon application of the physical quantity, deflection and offset in position of the movable electrode per se can result in an irregular change in distance between the movable and fixed electrodes, which often makes it impossible to obtain any desired capacitance change.

In contrast, the invention is such that the stiffness at the movable electrode in its deformation direction is made greater than the stiffness at the beam portion in its deformation direction while simultaneously making thinner to ensure that the beam width at the movable electrode in its deformation direction becomes substantially the same as the beam width at the beam portion in its deformation direction, which in turn makes it possible to prevent any unwanted deformation of the movable electrode upon application of the physical quantity while at the same time lightening the movable electrode.

Hence, in accordance with the present invention, it is possible to provide the capacitive physical quantity detector device capable of efficiently performing self-diagnosis without having to additionally provide any separate electrode for exclusive use in execution of the self-diagnosis. Note here that the beam width at the movable electrode in its deformation direction (movable electrode width), which is substantially the same as the beam width at the beam portion in its deformation direction (beam portion width) as has been stated supra, may be designed when reduction to practice so that the movable electrode width falls within a range of from 0.8 to 1.2 times of the beam portion width in view of the presence of possible fabrication errors during manufacture of the device.

Additionally, in case the fixed electrode is formed into a beam-like shape extending in almost parallel to the movable electrode while letting the movable electrode oppose the fixed electrode at a side face of the beam portion, if the beam width of such fixed electrode in the deformation direction of the beam portion is made substantially the same as the beam width at the movable electrode in its deformation direction then it becomes possible to reduce or minimize the device size in the deformation direction.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

The present invention will now be set forth in detail in conjunction with one preferred embodiment shown in the accompanying drawings below.

Figure 1:
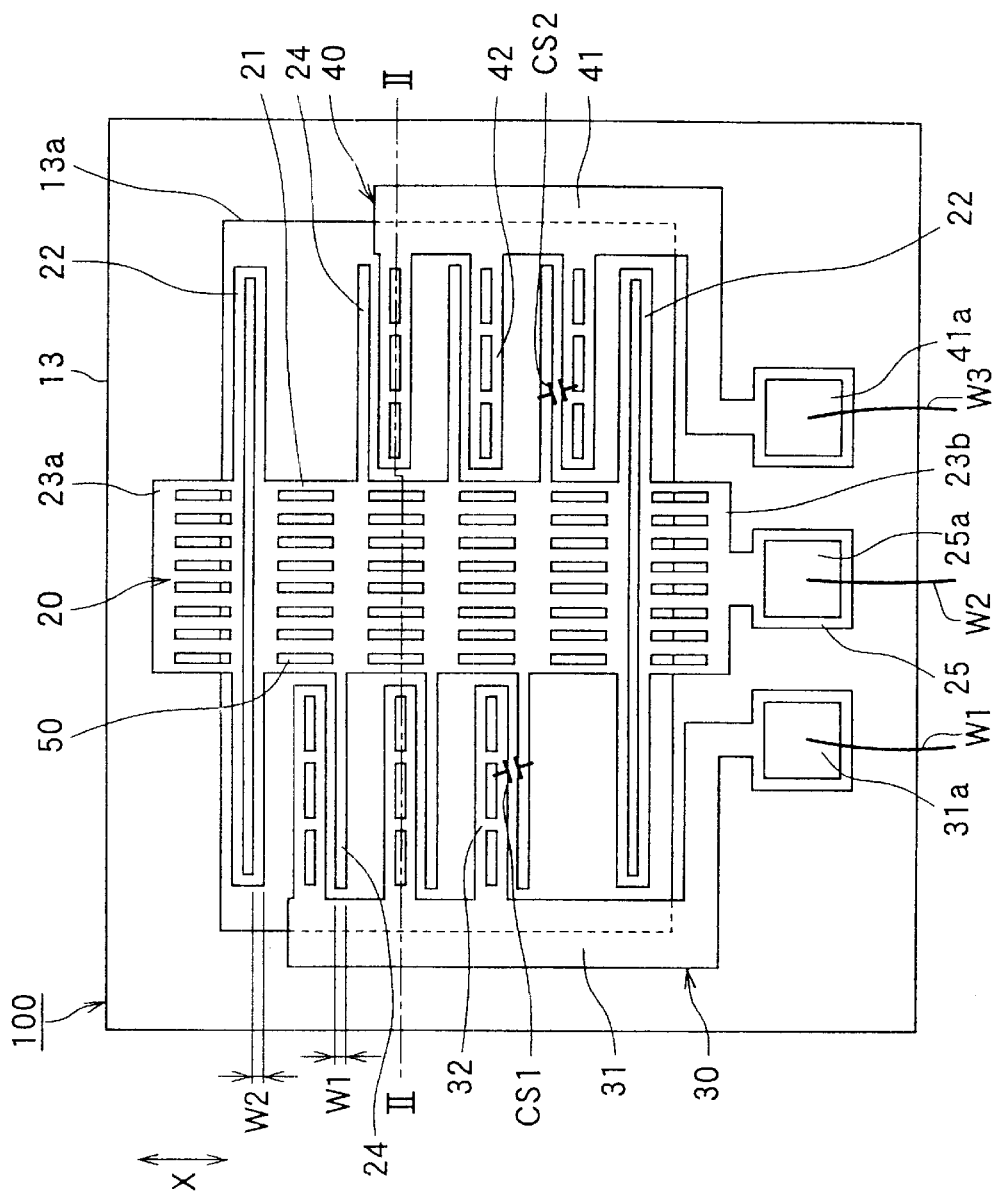
FIG. 1 is a diagram schematically showing a plan view of a semiconductor acceleration sensor in accordance with one preferred embodiment of the present invention.
Figure 2:
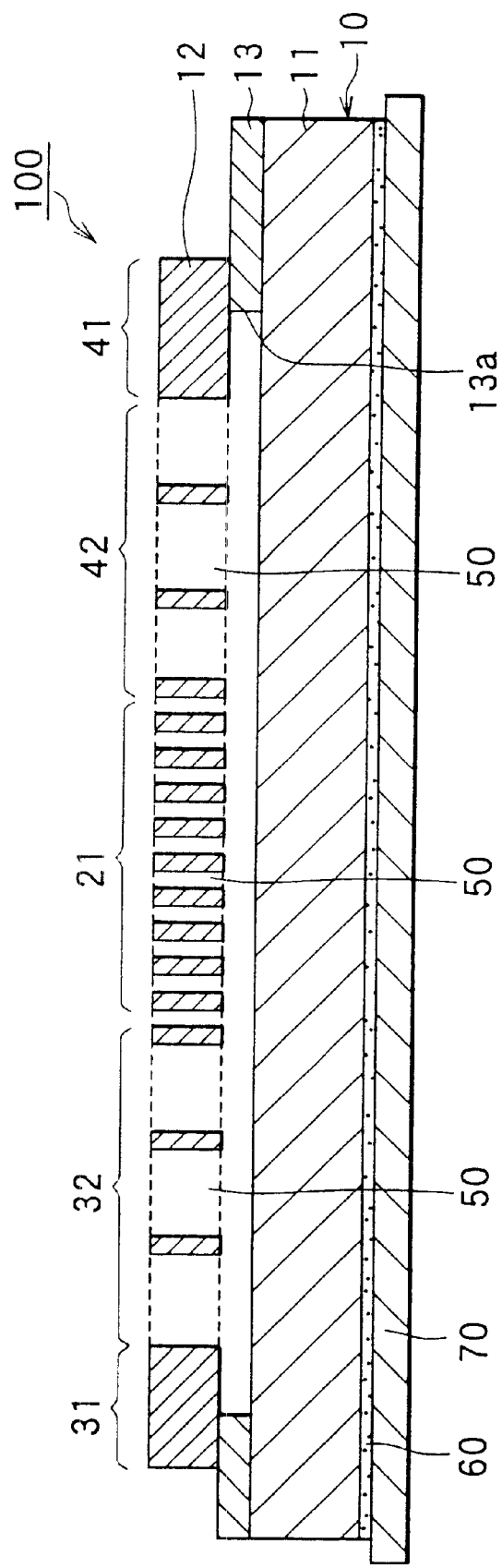
FIG. 2 is a diagram pictorially illustrating a cross-sectional view of the sensor of FIG. 1 taken along line II—II.

The illustrative embodiment is the one which applies the invention to a semiconductor acceleration sensor of the differential capacitance type as the capacitive physical quantity detection device. FIG. 1 shows a top plan view of the semiconductor acceleration sensor 100, and FIG. 2 is a pictorial representation of a cross-sectional view of the sensor taken along line II—II in FIG. 1. This semiconductor acceleration sensor 100 is preferably adaptable for use as an on-vehicle acceleration sensor or gyro sensor or else for operation control of an air bag, ABS, VSC and others, by way of example.

The semiconductor acceleration sensor (simply referred to hereafter as "sensor") 100 is fabricated through known micro-machining processes as applied to a semiconductor substrate. As shown in FIG. 2, the semiconductor substrate used in the sensor 100 is a rectangular SOI substrate 10 which includes a first silicon substrate 11 for use as a first semiconductor layer and a second silicon substrate 12 as a second semiconductor layer with an insulative or dielectric layer such as an oxide film sandwiched therebetween.

The second silicon substrate 12 is such that a beam structure of comb shape is formed through formation of grooves, which structure includes a movable portion 20 and stationary or fixed portions 30, 40. In addition, a selected portion of the oxide film 13 corresponding to the formation regions of the beam structure bodies 20–40 is removed away by sacrificial-layer etching techniques to define a rectangular opening 13a.

The movable portion 20 that is disposed to cross over the opening 13a is arranged so that a rectangular weight portion 21 is integrally coupled at its both ends to anchor portions 23a and 23b through a beam portion (so-called spring portion in this invention) 22, wherein these anchors 23a and 23b are secured to opening edge portions of the opening 13a in the oxide film 13 and thus supported on or over the first silicon substrate 11 serving as asupport substrate. This permits the weight 21 and beam 22 to face the opening 13a.

The beam portion 22 for use as the spring unit is formed into a rectangular frame shape with two beams coupled together at the both ends thereof and is deformable in a direction at right angles to an elongate direction of the beam to thereby exhibit spring functionality. Concretely, the beam portion 22 permits the weight 21 to deform and offset in position in a direction indicated by arrow "X" in FIG. 1 upon receipt of acceleration including a component along the arrow X direction while causing it to get back to its original state when such acceleration disappears. Hence, the movable portion 20 is deformable over the opening 13a in the deformation direction (arrow X direction) of the beam 22 in accordance with acceleration as applied thereto.

In addition, the movable portion 20 comprises a plurality of movable electrodes 24 that are formed so that these are integrally projected from both side faces of the weight 21 toward the opposite directions in a specified direction perpendicular to the deformation direction (arrow X direction) of beam 22. In FIG. 1, the movable electrodes 24 are such that three electrodes are projected on the right side of the weight 21 and other three ones are projected on the left side thereof, wherein each movable electrode 24 is formed into a beam-like shape with rectangular cross-section and faces the opening 13a. In this way, each movable electrode 24 is integrally formed with the beam 22 and weight 21 and is deformable along with the beam 22 and weight 21 in the deformation direction of beam 21.

Here, the illustrative sensor 100 is uniquely arranged so that a beam width W1 at each movable electrode 24 in its deformation direction (arrow X direction in FIG. 1) is substantially the same as a single beam width W2 at the beam portion 22 in its deformation direction (arrow X direction in FIG. 1) while simultaneously letting rigidity or stiffness at the movable electrode 24 in its deformation direction be greater than stiffness at the beam 22 in the deformation direction thereof. With this sensor 100,even when letting these beam widths W1, W2 be substantially the same as each other, the beam 22 may offer increased curvability (i.e. enhanced stiffness) in the deformation direction when compared to the movable electrode 24 with a single dead point for deformation because of the fact that the beam 22 is of the rectangular frame shape with two beams coupled together at both ends thereof as discussed previously and has two dead points for deformation.

The fixed portions 30, 40 are supported at a certain pair of opposite sides of those opposite side pairs at the opening edges of the opening 13a in the oxide film 13, at which pair none of the anchor portions 23a, 23b are held. Here, two fixed portions 30, 40 are provided so that the weight 21 is disposed between them. These fixed portions include the first fixed portion 30 placed on the left side in FIG. 1 and the second fixed portion 40 on the right side in FIG. 1, these fixed portions 30, 40 being electrically independent of each other.

Respective fixed portions 30, 40 are arranged to have lead wire portions 31 and 41 that are secured at opening edges of the opening 13a in the oxide film 13 and also supported on the first silicon substrate 11 and also a selected number (three in the example shown herein) of fixed electrodes 32 and a specified number (three, also) of fixed electrodes 42 which are oppositely disposed in the state that they are in parallel to one another with the presence of a detection distance with respect to a side face of the movable electrode 24. Additionally, let the fixed electrodes 32 on the first fixed portion 30 side be first fixed electrodes while letting the fixed electrodes 42 on the second fixed portion 40 side be second fixed electrodes. Respective fixed electrodes 32 and 42 extending substantially in parallel to the movable electrode 24 are each formed into a beam-like shape with a rectangular cross-section and are in the state that they are supported at respective leads 31, 41 in an open-sided or "overhung" fashion to face the opening 13a.

In addition, fixed electrode pads 31a, 41a for use in wire bonding are formed at specified positions on respective lead portions 31, 41 of respective fixed electrodes 30, 40. Additionally a movable electrode lead portion 25 is formed in the state that it is integrally coupled to one anchor portion 23b with a wire-bonding movable electrode pad 25a being formed at a specified position over this lead portion 25. The above-noted respective electrode pads 25a, 31a, 41a are made for example of aluminum.

Further, the weight 21 and anchors 23a–23b plus movable electrode 24 as well as respective fixed electrodes 32, 42 are provided with a plurality of rectangular through-going holes 50 that penetrate from the opening 13a side to its opposite side, wherein the presence of these though-holes 50 results in formation of a rigid-frame or so-called "Rahmen" structure shape with multiple rectangular frame-shaped portions combined together. Whereby, the movable portion 20 and respective fixed electrodes 32, 42 are reduced in weight while improving the twisting strength thereof.

In addition the sensor 100 shown is secured and bonded by adhesive 60 to a package 70 on a back surface (opposite surface to the oxide film 13) of the first silicon substrate 11. This package 70 contains or houses therein a circuit means 200. And, this circuit means 200 is electrically connected to the prescribed respective electrode pads 25a, 31a, 41a via conductive wires W1, W2, W3 which are formed of gold or aluminum bonding wires.

In the arrangement stated above, as indicated by capacitor symbols in FIG. 1, there are formed a first capacitive element CS1 at a detection gap space between the first fixed electrode 32 and the movable electrode 24 and a second capacitor CS2 at a detection spacing between the second fixed electrode 42 and movable electrode 24. And, upon receiving of acceleration, the entirety of the movable portion 20 excluding the anchor portions behaves to integrally deform and offset in position toward the arrow X direction due to the spring function of the beam portion 22, which in turn permits the aforesaid respective capacitors CS1, CS2 to change in capacitance value in accordance with such deformation of the movable electrode 24. And the detection circuit 200 is operable to detect the acceleration based on a change in differential capacitance (CS1–CS2) owing to the movable electrode 24 and fixed electrodes 32, 42.

Figure 3:
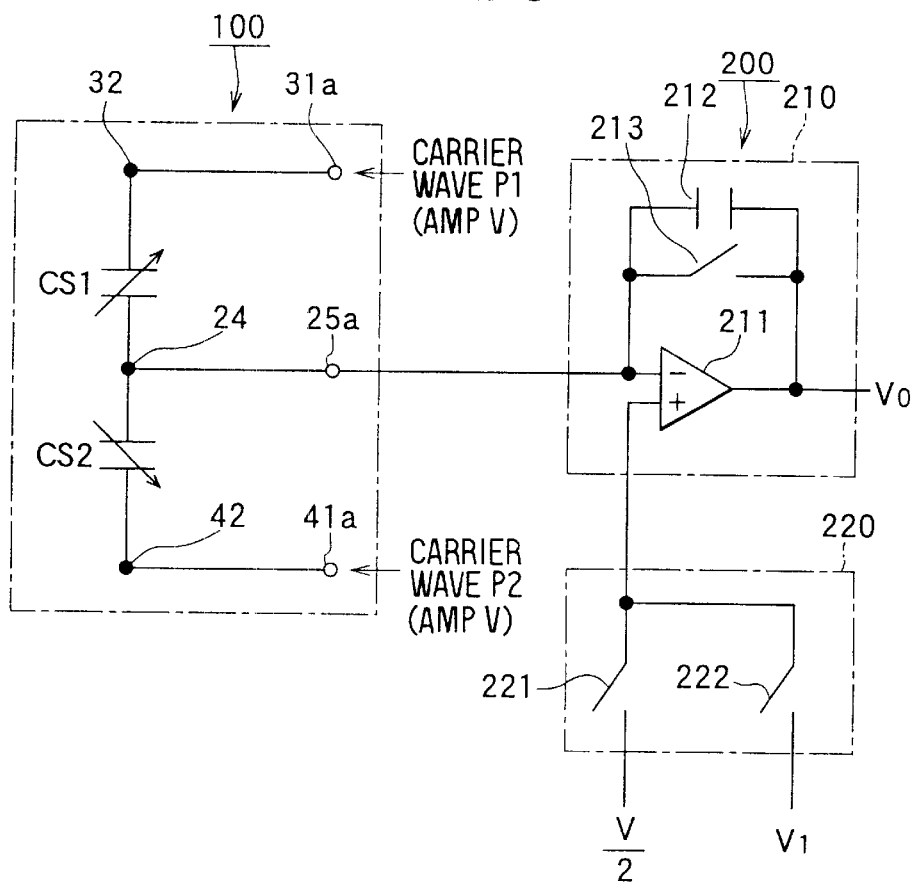
FIG. 3 is a diagram depicting one exemplary circuit configuration of the sensor shown in FIG. 1.

It should be noted that the circuit means 200 used in the illustrative sensor 100 and detection methodology are principally based on the teachings as disclosed in PUJPA No. 11-108454 to the same assignee as named herein, which is incorporated herein by reference in its entirety. Here, important features of the illustrative embodiment will mainly set forth below. See FIG. 3, which depicts a configuration of the circuit means 200 as provided in the sensor 100.

The circuit means 200 includes a C-V conversion circuit (switched capacitor circuit) 210 and a switch circuit 220. The C-V converter circuit 210 is the one that is formed of an operational amplifier 211 and capacitor 212 plus switch 213 and is operable to convert a change in capacitance values of the capacitors CS1, CS2 consisting of the movable electrode 24 and fixed electrodes 32, 42 into a corresponding output voltage.

The operational amplifier 211 has its inverting input terminal which is connected via the movable electrode pad 25a to the movable electrode 24, wherein the capacitor 212 and switch 213 are connected in parallel between the inverting input terminal and an output terminal of the amplifier. The operational amplifier 211 also has a non-inverting input terminal, to which either one of a voltage of V/2 and a voltage of V1 is input through the switch circuit 220.

The switch circuit 220 is the one that inputs either the V/2 voltage or V1 (different from V/2) voltage from respective voltage sources, not shown, to the non-inverting input terminal of the operational amplifier 211 in the C-V converter circuit 210, wherein the switch 220 circuit is configured from a switch 221 and a switch 222. The switch 221 and switch 222 are such that one of them is rendered conductive while the other is made nonconductive.

The circuit means 200 also includes a control circuit, not shown. This control circuit is operable to input a carrier wave P1 periodically changeable with a constant amplitude V from the fixed electrode pad 31a to the first fixed electrode 32 while inputting a carrier wave P2 from the fixed electrode pad 41a to the second fixed electrode 42, which wave P2 is the same in amplitude V as the carrier wave P1 and is exactly out of phase with the wave P1, with a phase difference of 180° defined therebetween. This control circuit is also designed to control turn-on/off operations of the switches 213, 221–222 at specified timings. In the illustrative embodiment this control circuit and the switch circuit 220 make up the signal application means of the present invention as disclosed and claimed herein.

Figure 4:
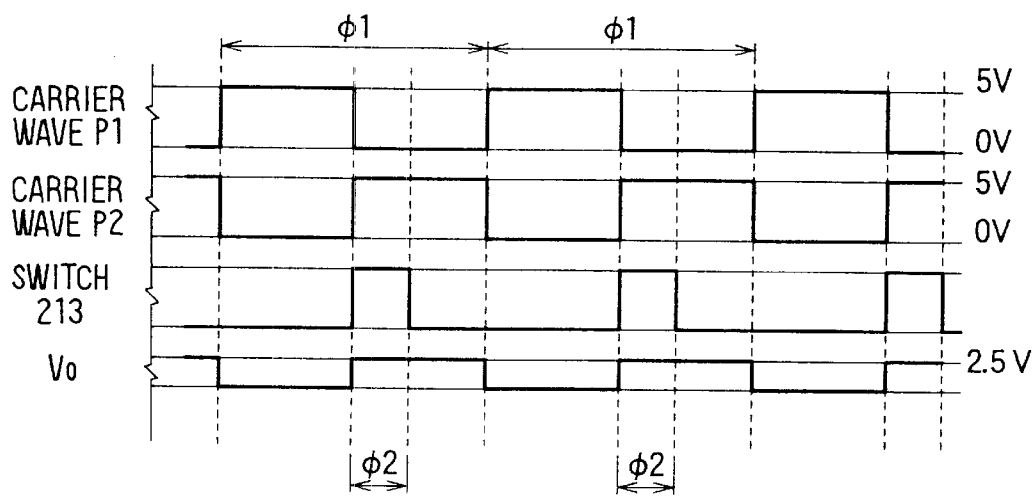
FIG. 4 is a wave form diagram of some major electrical signals during a normal operation of the circuitry of FIG. 3.

An operation of the semiconductor acceleration sensor 100 thus arranged is as follows. An explanation will first be given of application of an acceleration detection signal (normal operation mode) with reference to a signal waveform diagram shown in FIG. 4. As shown in FIG. 4 the carrier wave P1 (with amplitude of 0 to 5 volts at a frequency of 100 kHz, for example) as output from the control circuit serving as the signal application means is a rectangular wave signal of constant amplitude with its high level and low level changing with a time period $\phi 1$ as one cycle (e.g. 10 $\mu s$) whereas the carrier wave P2 is a rectangular wave signal with its voltage levels inverted relative to the carrier wave P1.

During the normal operation, when the carrier waves P1 and P2 are being applied to the fixed electrodes 32, 42 respectively, the switch circuit 220 is such that the switch 221 turns on whereas switch 222 turns off. Whereby, the voltage of V/2 is applied to the non-inverting input terminal of the operational amplifier 211 while causing the constant voltage (movable electrode signal) of V/2—e.g. 2.5 volts— to be applied to the movable electrode 24.

Under this condition, if no acceleration is applied then both a potential difference between the first fixed electrode 32 and the movable electrode 24 and also a potential difference between the second fixed electrode 42 and movable electrode 24 are set at V/2, thus allowing an electrostatic force between the first fixed electrode 32 and movable electrode 24 to be substantially equally balanced with an electrostatic force between the second fixed electrode 42 and movable electrode 24.

Also note that in the normal operation mode, the C-V converter circuit 210 is such that the switch 213 is driven to turn on and off at a timing shown in FIG. 4. When this switch 213 turns on (period $\phi 2$), the capacitor 212 is reset. On the other hand, when the switch 213 turns off, the intended acceleration detection is performed. In other words a remaining portion of the period $\phi 1$ other than the period $\phi 2$ is for use in detecting the acceleration applied. During this detection period, an output voltage V0 of the C-V converter circuit 210 may be given by Equation (1) which follows:

$$V0 = (CS1 - CS2) \cdot V'/Cf \qquad (1)$$

Here, V' is a voltage between the pads 31a and 41a, namely the voltage across fixed electrodes 32 and 42, and Cf is the capacitance of the capacitor 212.

Upon application of acceleration, the balance between the first capacitor CS1 and capacitor CS2 behaves to change.

This capacitance change results in production of a voltage defined by Equation 1 in accordance with a capacitance difference (CS1−CS2), which is added as a bias to an output voltage V0 obtainable in the absence of any acceleration applied thereto and is then derived as a modified output voltage V0 (ranging in potential from 0 to 5 volts for example). Thereafter, this output V0 is subject to signal processing at signal processor circuitry (not shown) including an amplifier circuit and low-pass filter or the like and is then detected as an acceleration detection signal.

Figure 5:
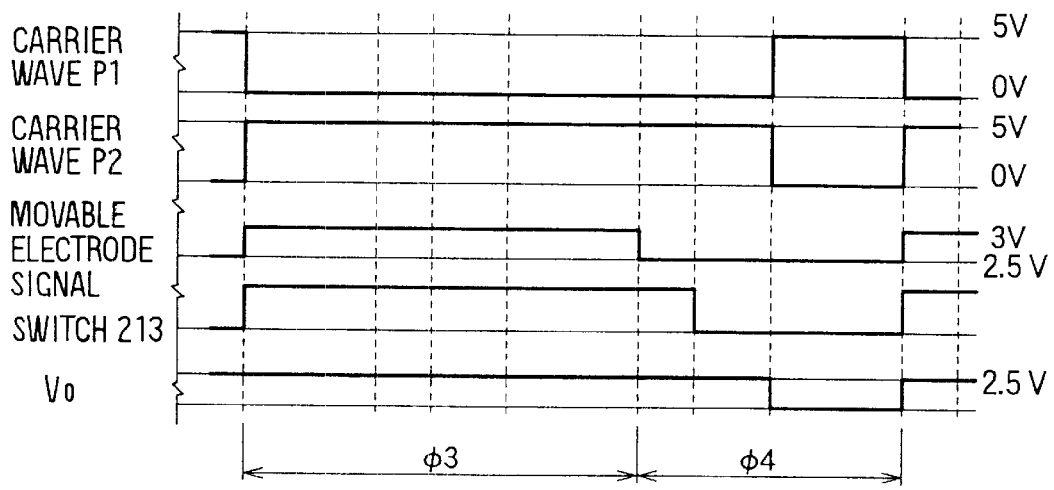
FIG. 5 is a waveform diagram of some major signals during a self-diagnosis operation of the circuit of FIG. 3.

An explanation will next be given of a self-diagnostic operation of the acceleration sensor 100 with reference to a signal waveform diagram shown in FIG. 5. As shown herein, the carrier waves P1 and P2 that are rectangular wave signals with constant amplitude V (ranging from 0 to 5 volts in the example shown) are input under control of the control circuit serving as the signal application means. Note here that within a time period φ3 (e.g. 100 μs), the carrier waves P1 and P2 are constant voltage signals with their potential levels inverted—for example, carrier wave P1 is set at 0V whereas carrier wave P2 is at 5V.

Also note that in this period φ3 the switch circuit 220 is such that the switch 221 turns off whereas switch 222 turns on when the carrier waves P1 and P2 are being applied to the fixed electrodes 32, 42 respectively. Due to this, a voltage V1 that is potentially different from the V/2 (e.g. 3 V) is applied to the non-inverting input terminal of the operational amplifier 211 while allowing this voltage V1 to be applied as a movable electrode signal to the movable electrode 24.

When applying the voltage V1 to the movable electrode 24, the balance in electrostatic force during the normal operation is destroyed causing the movable electrode 24 to be attracted toward certain one of the fixed electrodes 32, 42 which is presently greater than the other in potential difference between itself and movable electrode 24. In the example shown in FIG. 5, the beam portion 22 deflects letting it be attracted toward the first fixed electrode 32 while at the same time permitting the movable electrode 24 to virtually deform in a way integral therewith. In this way, the period φ3 is the period that permits generation of quasi-acceleration at the movable electrode 24. Additionally the switch 213 of the C-V converter circuit 220 is turned on within the period ¢3 so that the capacitor 212 is in the reset state.

A time period φ4 (e.g. 10 μs) next to the period φ3 is for detection of the quasi-acceleration (physical quantity) as generated in its immediately preceding period φ3 through application of a signal similar in waveform to that during the period φ1 shown in FIG. 4 between the movable electrode 24 and fixed electrodes 32, 42. More specifically, turn off the switch 213 of C-V converter circuit 220 to let the capacitor 212 be set in the state capable of detection of acceleration while applying thereto the carrier waves P1 and P2 that are similar to those in the normal operation mode. Additionally, in the switch circuit 220, turn on the switch 221 while letting the switch 222 turn off to thereby apply a constant voltage of V/2 (e.g. 2.5 volts) to the movable electrode 24 as a drive electrode signal.

In this event, the movable electrode 24 which has been attracted toward the first fixed electrode 32 by way of example within this period φ4 now attempts to return to its original position, resulting in production of charge carriers at the capacitor 212 of C-V converter circuit 220 in a way pursuant to this capacitance change to thereby enable detection of the quasi-acceleration as generated within the period φ3. The intended self diagnosis is thus achievable by applying between the movable electrode 24 and fixed electrodes 32, 42 a specific self-diagnosis signal (the carrier waves and movable electrode signal) with a combined time period (φ3+φ4) being as one cycle in the way discussed above.

It should be noted here that this embodiment is specifically designed so that a ratio of a frequency of the self-diagnosis signal (referred to as "self-diagnosis frequency" hereinafter) to the beam portion 22's resonance frequency in deformation direction (referred to hereafter as "resonance frequency of sensor device") is set such that the resonance magnification of such beam portion 22 is more than or equal to one time—preferably, 1.1 times or greater—upon application of the self-diagnosis signal. This self-diagnosis frequency setup is based on specific considerations as will be described below.

Figure 6:
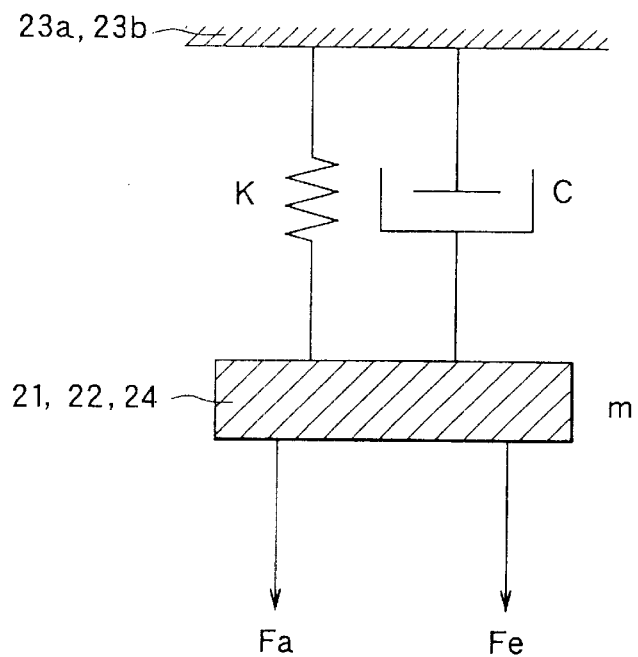
FIG. 6 is a diagram showing a pictorial representation for explanation of a model of a vibration system in the FIG. 1 sensor structure.

See FIG. 6. This diagram illustrates the vibration system of the semiconductor acceleration sensor 100 as a generalized model in capacitive physical quantity detection device. In this model, the movable portion with deformability (deformable movable portion) is certain part of the movable portion 20 excluding the anchors 23a, 23b—that is, weight portion 21, beam portion 22, and movable electrode 24. Letting the mass of this deformable movable portion (movable portion's mass) be "m" and its offset in position or deformation be "x," the equation of vibration may be given by Equation (2) which follows:

$$m \cdot (d^2x/dt^2) + C \cdot (dx/dt) + K \cdot x = Fa + Fe \qquad (2)$$

In the equation above, m is the movable portion's mass, is the damping or attenuation coefficient of the deformable movable portion, K is the spring constant in detection axis direction (deformation direction) of the beam portion 22, Fa is an external input G, and Fe is the electrostatic force between the movable electrode 24 and fixed electrodes 32, 42. Although during normal operation Fa becomes an externally applied acceleration, Fa is at zero during self-diagnosis. At this time the resultant deformation or offset "x" of the deformable movable portion is definable by the above-identified vibration equation.

Figure 7A:
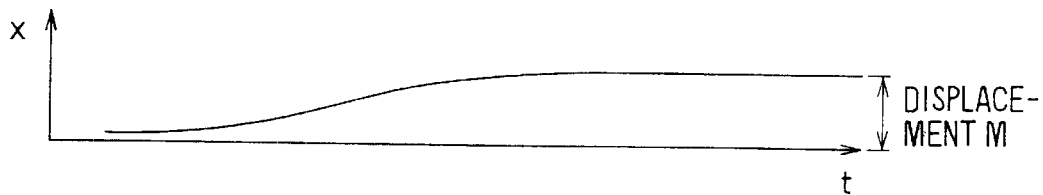
FIGS. 7A and 7B are diagrams each showing a change in deformation with time at a movable part of the sensor structure.
Figure 7B:
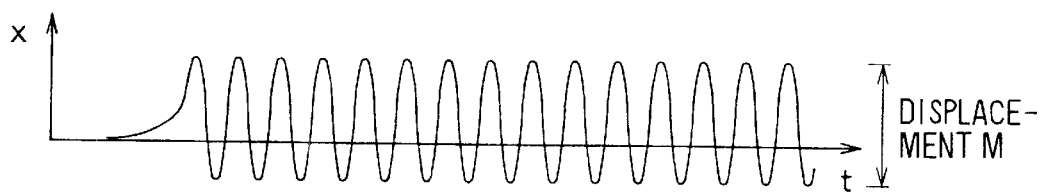

FIGS. 7A–7B are diagrams for explanation of a change with time "t" in offset x of the deformable movable unit, wherein FIG. 7A is in the event that a frequency difference between the self-diagnosis frequency and the sensor device's resonance frequency is great whereas FIG. 7B is the case where such frequency difference stays less. In case the sensor device's resonance frequency and the self-diagnosis frequency are greatly different from each other, it is hardly attainable to keep track of the beam portion 22's movement or motion with respect to the self-diagnosis frequency. More specifically, as shown in FIG. 7A, the beam 22 exhibits no vibration resulting in establishment of a DC-like deformation state with a DC (direct current) voltage being virtually applied thereto. For example, with the illustrative sensor 100, this state may be obtained when the sensor device's resonance frequency is set at approximately 7 kHz with the self-diagnosis frequency being set at about two times greater than the former (ranging from 12 to 13 kHz).

In contrast, if the sensor device's resonance frequency is near in value to the self-diagnosis frequency then the beam portion 22 behaves to vibrate at its self-diagnosis frequency as shown in FIG. 7B, thereby enabling the resulting deformation amount M—i.e. positional offset of the deformable movable unit—to become greater as compared to the DC-like deformation. To be brief, specifically setting up the self-diagnosis frequency to permit the beam 22 to vibrate upon application of an appropriate self-diagnosis signal makes it possible upon application of such self-diagnosis signal to allow the beam 22 to exhibit vibration with its resonance magnification of more than or equal to one time, which may in turn enable likewise increase in the above-noted capacitance difference (CS1–CS2), i.e. an output of the sensor. Note that the resonance magnification as used herein is to be understood to mean a magnification of the deformation amount M relative to the beam 22's deformation obtainable upon applying of a DC voltage (that is, the deformable movable unit's offset in position), which deformation is normalized at "1."

And the self-diagnosis frequency for causing the beam portion 22 to vibrate with more than or equal to one time of resonance magnification during self-diagnosis may be defined through calculation using the following Equation (3) relating to the above-noted deformation amount M. Additionally, let the self-diagnosis frequency be denoted by "fs," and the sensor device's resonance frequency be "fo."

$$M = 1/\{(1-\lambda^2)^2 + (2\tau\lambda)^2\}^{1/2} \quad (3)$$

Here, $\tau$ is $C/\{2 \cdot (mk)^{1/2}\}$, where $\lambda$ is fs/fo. The calculated resonance magnification of the beam portion 22 is shown in FIG. 8, which was obtained through calculation of the deformation amount M while varying the ratio of the sensor device's resonance frequency fo to self-diagnosis frequency fs.

Figure 8:
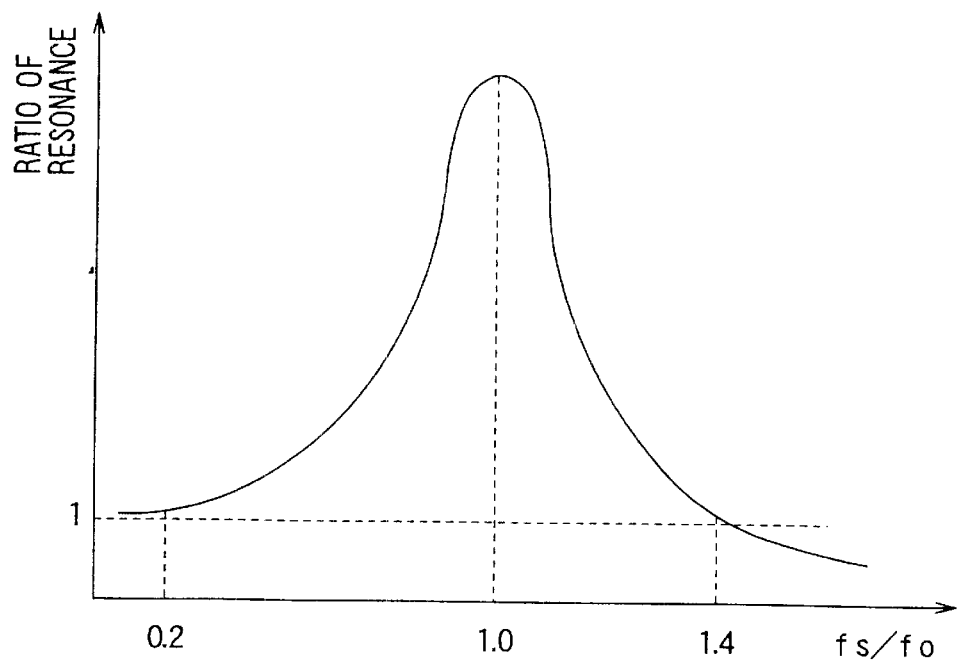
FIG. 8 is a graph showing a relation of a ratio of the sensor's resonance frequency fo to self-diagnosis frequency fs versus the resonance magnification of a beam portion of the sensor.

It is apparent from viewing FIG. 8 that a specific range of the fo/fs ratio exists for permitting the beam portion 22 (i.e. deformable movable unit) to vibrate with the resonance magnification of more than or equal to one time. To set the resonance magnification be of more than or equal to one time, it should be required that the self-diagnosis frequency fs be less than or equal to a specific value that is 1.41 times greater than the sensor device's resonance frequency fo. In addition, it will be preferable that the resonance magnification be greater than or equal to 1.1 times in order to more efficiently perform the intended self-diagnosis; to this end, it is required that the self-diagnosis frequency fs falls within a range of from 0.2 to 1.4 times greater than the sensor device's resonance frequency fo. The foregoing discussion has clarified the ground of setup for normalization of the self frequency.

It has been discussed that in accordance with the illustrative embodiment, since the self-diagnosis signal is periodically applied between the movable electrode 24 and fixed electrodes 32, 42 during a self-diagnostic operation, it becomes possible through generation of an appropriate electrostatic force between the movable electrode 24 and fixed electrodes 32, 42 to obtain the state in which the acceleration (physical quantity) of interest virtually takes place at the movable electrode 24. And it is possible to perform the intended self-diagnosis by detecting deformation or offset in position of the movable electrode 24 on the basis of an output voltage V0 of the C-V converter circuit 220.

Furthermore, this embodiment is specifically arranged so that the ratio of the self-diagnosis frequency fs to the sensor device's resonance frequency fo is set so that the beam portion 22's resonance magnification becomes more than or equal to one time (preferably 1.1 times). With such an arrangement, it is possible to allow the beam 22 to vibrate at its self-diagnosis frequency upon application of the self-diagnosis signal, which in turn makes it possible to increase the quasi-physical quantity generated at the movable electrode 24 thus enabling the self-diagnosis to be done efficiently.

Hence, in accordance with the embodiment discussed herein, it is possible to provide the capacitive physical quantity detection device 100 capable of reducing or shrinking the dimension (chip size) thereof without having to employ any additional electrode of separate component for exclusive use in self-diagnostic procedure and also capable of efficiently performing the self-diagnosis. And, through such self-diagnosis, it is possible to detect an operation failure or malfunction because of the fact that the output voltage V0 is kept unchanged in cases where the capacitance remains unchanged due to attachment of contaminants between the movable electrode 24 and fixed electrodes 32, 42. In addition, even where the sensitivity is varied due to a change with time, it is possible to detect such sensitivity change based on a change amount of the output voltage.

It must be noted that although in the above embodiment the movable electrode 24 is forced to virtually deform while changing the voltage being applied to the movable electrode 24 between the normal operation mode and the self-diagnosis mode, the embodiment may be modified so that the self-diagnosis is done by potentially changing the carrier waves P1, P2 being applied to the fixed electrodes 32, 42 for virtual deformation of the movable electrode 24.

Additionally the spring portion should not exclusively be formed into the beam-like shape as stated supra and may alternatively be designed to have any other shapes as far as these offer similar spring functionalities to that of the beam portion 22. Also note that the present invention should not be limited only to the illustrative semiconductor acceleration sensor 100 and may also be applicable to any other physical quantity detection devices of the capacitance type including, but not limited to, pressure sensors and yaw rate sensors.

Incidentally, in the event of this self-diagnosis, an increase in deformation of the movable electrode 24 would result in a likewise increase in change of capacitance values of the capacitors CS1, CS2 consisting of the movable electrode 24 and fixed electrodes 32, 42, which in turn makes it possible to increase the output voltage V0 thus enabling efficient execution of the self-diagnosis required. One approach to attaining this is to lighten the movable portion 20. To lighten the movable portion 20, it is required that the weight portion 21 be minimized in weight with use of the aforesaid Rahmen structure or other similar suitable structures while simultaneously letting the movable electrode 24 be reduced in weight.

It is considered that weight reduction of the movable electrode 24 is attainable through reduction in total length of the beam; however, in such case, its opposition area (electrode area) with respect to the fixed electrodes 32, 42 can decrease resulting in an undesirable decrease in capacitance values CS1, CS2 for detection. In view of this, it has been decided to realize the weight reduction of movable electrode 24 by narrowing the beam width W1 (referred to as movable electrode width W1 hereinafter) at the movable electrode 24 in its deformation direction.

However, an excessive decrease in this movable electrode width W1 can result in not only the beam portion 22 but also the movable electrode 24 per se being deflected and deformed accordingly. Although in the acceleration sensor of this type it is required that the beam s deformation and the movable electrode's deformation be integral with each other in the same direction upon application of acceleration, if the movable electrode itself is deformed and offset in position then a change in detection distance between the movable electrode and the fixed electrodes becomes irregular, which in turn makes it impossible or at least greatly difficult to obtain any desired capacitance change.

In this respect, the sensor 100 stated herein is specifically designed to have its unique arrangement—that is, narrowing is done to let the movable electrode width W1 become substantially the same as the beam width W2 (referred to hereafter as beam portion width W2) of a single one at the beam portion 22 in its deformation direction (arrow X direction in FIG. 1) while ensuring that the rigidity or stiffness at the movable electrode 24 in its deformation direction is greater than the stiffness at the beam portion 22 in the deformation direction thereof. With such an arrangement, it is possible to prevent deflection or arcuation of the movable electrode 24 upon application of acceleration while lightening the movable electrode 24, which in turn makes it possible to increase quasi—deformation of the movable electrode 24 to thereby enable achievement of efficient self-diagnostic procedure.

Note here that the setup for substantial equalization of the movable electrode width W1 and beam width W2 may permit the movable electrode width W1 to fall within a range of from 0.8 to 1.2 times of the beam width W2 in view of the presence of any possible machining/fabrication errors in the manufacture of the sensor 100 using currently available microfabrication techniques on the micron orders (including etching, etc.).

Hence, in accordance with the embodiment discussed herein, it is possible to provide the capacitive physical quantity detection device 100 capable of reducing or shrinking the dimension (chip size) thereof without having to employ any additional electrode of separate component for exclusive use in self-diagnostic procedure and also capable of efficiently performing the self-diagnosis. And, through such self-diagnosis, it is possible to detect an operation failure or malfunction because of the fact that the output voltage V0 is kept unchanged in cases where the capacitance remains unchanged due to attachment of contaminants between the movable electrode 24 and fixed electrodes 32, 42. In addition, even where the sensitivity is varied due to a change with time, it is possible to detect such sensitivity change based on a change amount of the output voltage.

Additionally, when lightening the movable electrode 24 as in this embodiment, the resultant sensitivity can decrease in the normal operation mode under certain circumstances. Fortunately this risk is avoidable by using a specific way of thinking which follows. In this acceleration sensor 100 the sensitivity $\Delta C$ and self-diagnosis output J may be given as the following set of Equations (4):

$$\Delta C = 2 \cdot C_0 \cdot m \cdot g / (d \cdot K)$$

$$J = \epsilon \cdot S \cdot D \cdot V^2 / (2 \cdot m \cdot d^2) \quad (4)$$

Here, Co is the initial capacitance value (=$\epsilon \cdot S/d$ in unit of F) when the acceleration of interest is at zero, m is the mass (in unit of "kg") of the movable portion, d is the distance (in unit of "m") between the movable and fixed electrodes, K is the spring constant (N/m), S is the electrode area (area of the part opposing the movable and fixed electrodes in unit of "$m^2$"), D is the duty ratio during self-diagnosis, and V (in unit of "V") is a voltage during self-diagnosis.

Hence, decreasing the mass m for increasing the self-diagnosis output J may result in a decrease in sensitivity $\Delta C$ in light of the fact that the sensitivity $\Delta C$ is proportional to mass m. However, when looking at Equation 4, it is affirmed that the term "K" exists which affects the sensitivity $\Delta C$ rather than the self-diagnosis output J. To make long story short, any unwanted sensitivity reduction maybe prevented through appropriate adjustment in value of the spring constant K. Additionally, in view of the fact that the resonance frequency $\omega_o$ of a vibratory body is given as $\omega_o = (K/m)^{1/2}$, even where the mass m of the movable electrode is half reduced by way of example, none of the sensitivity and resonance frequency vary in value as far as the spring constant K of the beam portion 22 is half reduced; thus, the intended sensor characteristics maybe retained during normal operations. Concretely, in the sensor 100, the spring constant of the beam 22 may be lessened by making the beam 22 greater in length.

It should be noted that in case the fixed electrodes 32, 42 are of the beam-like shape extending in substantially parallel to the movable electrode 24 while letting the movable electrode 24 and fixed electrodes 32, 42 oppose each other on side faces of the beam as in the illustrative embodiment, the beam widths of the fixed electrodes 32, 42 in the deformation direction (arrow X direction in FIG. 1) of the beam portion 22 may be designed to substantially equal to the movable electrode width WI. This makes it possible to reduce the size of the device in the deformation direction (arrow X direction in FIG. 1).

What is claimed is:

1. A capacitive physical quantity detection device comprising:

a spring portion deformable upon application of a physical quantity in a specified direction to thereby have a spring function;

a movable electrode integrally formed with the spring portion and deformable along with the spring portion in a deformation direction of the spring portion;

a fixed electrode disposed opposing the movable electrode;

signal application means connected to the movable portion and the fixed portion, for selectively applying between the movable electrode and the fixed electrode any one of periodically changeable signals including a detection signal for detection of the physical quantity and a self-diagnosis signal for use in performing self-diagnosis; and a C-V conversion circuit for generating an output voltage pursuant to a change in a capacitive element defined between the movable electrode and the fixed electrode, wherein the capacitive element is changeable in capacitance during application of the detection signal to thereby permit detection of the physical quantity;

the spring portion is deformable upon application of the self-diagnosis signal to permit creation of a quasi-physical quantity at the movable electrode; and a ratio of a frequency of the self-diagnosis signal to a resonance frequency of the spring portion in its deformation direction is set so that a resonance magnification of the spring portion is more than or equal to one time upon applying of the self-diagnosis signal.

2. A capacitive physical quantity detection device according to claim 1, wherein the ratio of the frequency of the self-diagnosis signal to the resonance frequency of the spring portion in its deformation direction being set so that resonance magnification is 1.1 times or greater upon applying of the self-diagnosis signal.

3. A capacitive physical quantity detection device comprising:

a spring portion deformable upon application of a physical quantity in a specified direction to thereby have a spring function;

a movable electrode integrally formed with this spring portion and deformable along with the spring portion in a deformation direction of the spring portion;

a fixed electrode disposed opposing the movable electrode;

signal application means connected to the movable portion and the fixed portion, for selectively applying between the movable electrode and the fixed electrode any one of periodically changeable signals including a detection signal for detection of the physical quantity and a self-diagnosis signal for use in performing self-diagnosis; and a C-V conversion circuit for generating an output voltage pursuant to a change in a capacitive element defined between the movable electrode and the fixed electrode, wherein the capacitive element is changeable in capacitance during application of the detection signal to thereby permit detection of the physical quantity;

the spring portion is deformable upon application of the self-diagnosis signal to permit creation of a quasi-physical quantity at the movable electrode; and the self-diagnosis signal having a frequency less than or equal to a specified value that is 1.41 times of a resonance frequency of the spring portion in a deformation direction thereof.

4. A capacitive physical quantity detection device according to claim 3, wherein the frequency of the self-diagnosis signal ranges from 0.2 to 1.4 times of the resonance frequency of the spring portion in the deformation direction thereof.

5. A capacitive physical quantity detection device comprising:

a spring portion deformable upon application of a physical quantity in a specified direction to thereby have a spring function;

a movable electrode integrally formed with the spring portion and deformable along with the spring portion in a deformation direction of the spring portion;

a fixed electrode disposed opposing the movable electrode;

signal application means connected to the movable portion and the fixed portion, for selectively applying between the movable electrode and the fixed electrode any one of periodically changeable signals including a detection signal for detection of the physical quantity and a self-diagnosis signal for use in performing self-diagnosis; and a C-V conversion circuit for generating an output voltage pursuant to a change in a capacitive element defined between the movable electrode and the fixed electrode, wherein the capacitive element is changeable in capacitance during application of the detection signal to thereby permit detection of the physical quantity;

the spring portion is deformable upon application of the self-diagnosis signal to permit creation of a quasi-physical quantity at the movable electrode; and a ratio of a frequency of the self-diagnosis signal to a resonance frequency of the spring portion in its deformation direction being set to cause the spring portion to vibrate upon application of the self-diagnosis signal.

6. A capacitive physical quantity detection device comprising:

a beam portion deformable upon application of a physical quantity in a direction substantially at right angles to an elongate direction of the beam portion;

a movable electrode being integrally formed with the beam portion into a beam-like shape extending in the same direction as the elongate direction of the beam portion and being deformable along with the beam portion in a deformation direction of the beam portion;

a fixed electrode disposed opposing the movable electrode;

signal application means connected to the movable portion and the fixed portion, for selectively applying between the movable electrode and the fixed electrode any one of periodically changeable signals including a detection signal for detection of the physical quantity and a self-diagnosis signal for use in performing self-diagnosis;

a C-V conversion circuit for generating an output voltage pursuant to a change in a capacitive element defined between the movable electrode and the fixed electrode, wherein the capacitive element is changeable in capacitance during application of the detection signal to thereby permit detection of the physical quantity;

the beam portion is deformable upon application of the self-diagnosis signal to permit creation of a quasi-physical quantity at the movable electrode; and a beam width at the beam portion in the deformation direction thereof being substantially identical to a beam width at the beam portion in its deformation direction while letting stiffness at the movable electrode in its deformation direction be greater than stiffness at the beam portion in the deformation direction thereof.

7. A capacitive physical quantity detection device according to claim 6, wherein the beam width at the movable electrode in its deformation direction ranges from 0.8 to 1.2 times of the beam width at the beam portion in the deformation direction thereof.

8. A capacitive physical quantity detection device according to claim 6, wherein:

the fixed electrode is elongated in substantially parallel to the movable electrode, the movable electrode and the fixed electrode oppose each other at a side face of the beam portion, herein the beam width of the fixed electrode in the deformation direction of the beam portion is substantially identical to the beam width at the movable electrode in its deformation direction.

* * * * *